United States Patent
Ezerzere et al.

(10) Patent No.: US 8,447,444 B2
(45) Date of Patent: May 21, 2013

(54) METHOD AND DEVICE FOR AUTOMATICALLY DETECTING A LATERAL DISSYMETRY OF AN AIRCRAFT

(75) Inventors: Pierre Ezerzere, Toulouse (FR); Stéphane Puig, Lauzerville (FR)

(73) Assignee: Airbus Operations (SAS), Toulouse (FR)

( * ) Notice: Subject to any disclaimer, the term of this patent is extended or adjusted under 35 U.S.C. 154(b) by 396 days.

(21) Appl. No.: 12/780,577

(22) Filed: May 14, 2010

(65) Prior Publication Data
US 2010/0292872 A1 Nov. 18, 2010

(30) Foreign Application Priority Data
May 18, 2009 (FR) ...................... 09 02375

(51) Int. Cl.
*H04Q 3/00* (2006.01)
*G05D 1/00* (2006.01)
*G01C 5/00* (2006.01)

(52) U.S. Cl.
CPC .............. *G01C 5/005* (2013.01); *G05D 1/0066* (2013.01)
USPC .................................. 701/9; 701/1; 340/945

(58) Field of Classification Search
None
See application file for complete search history.

(56) References Cited

U.S. PATENT DOCUMENTS

| | | | |
|---|---|---|---|
| 4,964,599 A * | 10/1990 | Farineau | ........................ 244/195 |
| 5,170,969 A | 12/1992 | Lin | |
| 2002/0169526 A1 | 11/2002 | Alwin et al. | |
| 2003/0015032 A1 | 1/2003 | Glenney | |
| 2008/0133069 A1 | 6/2008 | Morales De La Rica et al. | |
| 2009/0005919 A1 | 1/2009 | Boe et al. | |
| 2011/0184623 A1 * | 7/2011 | De Boer | ........................ 701/99 |

FOREIGN PATENT DOCUMENTS

WO 2007019135 2/2007

OTHER PUBLICATIONS

Non Final Office Action mailed Aug. 1, 2012 in U.S. Appl. No. 12/780,669 (8).

* cited by examiner

*Primary Examiner* — Ryan Zeender
*Assistant Examiner* — Denisse Ortiz Roman
(74) *Attorney, Agent, or Firm* — Novak Druce Connolly Bove + Quigg LLP

(57) ABSTRACT

The device (1) includes means (2, 3, 4) for observing the overall conditions of the aircraft and for determining whether the lateral behavior thereof is normal.

10 Claims, 6 Drawing Sheets

METHOD AND DEVICE FOR AUTOMATICALLY DETECTING A LATERAL DISSYMETRY OF AN AIRCRAFT

CROSS-REFERENCE TO RELATED APPLICATIONS

This application claims priority to French Patent Application 0902375, filed May 18, 2009, the contents of which are incorporated herein by reference.

FIELD OF THE INVENTION

This invention relates to a method and a device for automatically detecting, on board an aircraft, a lateral dissymmetry of said aircraft.

BACKGROUND OF THE INVENTION

It is known that some types of breakdowns on an aircraft, such as undesired movements of control surfaces, incorrect lateral centring, undesired extension of thrust reversers or outside conditions such that a frost accretion difference between the right wing and the left wing, can generate a lateral dissymmetry of the aircraft. By lateral dissymmetry, it is meant the default of symmetry between right side and left side of the aircraft, with respect to the median vertical plan of said aircraft.

Such a lateral dissymmetry results in the following effects on the behaviour of an aircraft, in particular a cargo aircraft:
it generates a roll movement which is generally compensated for by control surfaces of the roll axis (for example ailerons and spoilers); and
it generates a yaw movement which is generally compensated for by control surfaces of the yaw axis (for example the rudder unit).

The direction and magnitude of such movements depend on the side of dissymmetry and the type of breakdowns or the outside environmental conditions at the origin of such movements. This dissymmetry is compensated for, during the flight, either automatically by an auto-flight device of the aircraft, either manually by the pilot using the control members. Such compensation generates an increase of the drag in addition to the additional drag already induced by the dissymmetry. Such increase is proportional to the nature and level of the dissymmetry to be corrected and which results in an increase of fuel consumption.

This phenomenon, if it remains for a significant time, results in an overconsumption of fuel and, in extreme cases, a temporary loss of control of the aircraft and a diversion thereof.

The usual solutions in order to be protected against breakdowns such as mentioned above are based on monitoring actuators of control means.

Yet, these usual solutions are specific to different types of breakdowns, for example engine breakdowns or uncontrolled deflections of the control surfaces such as ailerons. Such usual solutions are not capable of detecting all breakdowns or changes of outside environmental conditions which can lead to an unusual behaviour of the aircraft, for example a lateral dissymmetry.

In particular, from document FR-2,897,592, a method and device are known for detecting a lateral dissymmetry which appears when the roll control surfaces of an aircraft are positioned near the abutments thereof, without control of the pilot of the aircraft. This usual detection method includes the following steps of:

a) determining the current value of a control parameter which is representative of all the roll control surfaces of the aircraft;
b) comparing such current value with a predetermined reference value;
c) determining a current deflection angle of a lateral stick of the aircraft, which is likely to be actuated by a pilot of the aircraft for controlling the roll control surfaces;
d) comparing such current deflection angle with a predetermined angle value; and,
e) if at a time the current value of the control parameter is higher than the reference value and the current deflection angle is higher than the angle value, transmitting a visual alarm signal on a visualisation display screen of the aircraft cockpit, which indicates the detection of a lateral dissymmetry of the aircraft.

SUMMARY OF THE INVENTION

This invention relates to a method for automatically detecting, on board an aircraft, during a flight, a lateral dissymmetry of said aircraft, said method enabling the above mentioned drawbacks to be overcome.

For that purpose, according to the invention, said method is remarkable in that, automatically:
a) current values of a first couple of flight parameters of the aircraft, which are likely to be affected by a lateral dissymmetry of the aircraft and current values of a second couple of auxiliary parameters illustrating the deflections of control surfaces of the aircraft, which act on the lateral behaviour of the latter are determined;
b) a dynamic monitoring function is carried out, comprising or consisting of:
on the one hand, checking whether said current values of said first couple are in a first predetermined set of couples of flight parameters;
on the other hand, checking whether said current values of said second couple are in a second predetermined set of couples of auxiliary parameters; and
generating a dissymmetry information indicating on which side of the aircraft is the origin of a dissymmetry and transmitting an enabling signal, when, at least during a predetermined period, said first and second couples of current values are simultaneously in said first and second sets respectively,
said successive steps a) and b) being implemented repeatedly;
c) when an enabling signal is transmitted, at the end of a predetermined auxiliary period after such transmission, performing a static confirmation function for checking whether the current values at the level of the said second couple are in a predetermined auxiliary set of auxiliary parameters and transmitting a detection signal which indicates the detection of a lateral dissymmetry and the side of the lateral dissymmetry, if said current values are in said auxiliary set is carried out; and
d) when a detection signal is transmitted, using said dissymmetry information on board the aircraft.

The method according to the invention therefore enables an automatic real time on board detection of a lateral dissymmetry of said aircraft. For that purpose, said method provides, on the one hand, monitoring a combination of current values of parameters (flight parameters and auxiliary parameters) of the aircraft and identifying dynamic patterns corresponding to an unusual behaviour, and on the other hand, characterising and confirming a dissymmetry based on equilibrium deflections of control surfaces.

This detection method is therefore based on observing the conditions of the aircraft and control surfaces which act on the lateral behaviour thereof. It relies on the overall behaviour of the aircraft and refers to the reactions of said aircraft when it is subjected to a lateral dissymmetry. Through these characteristics, the method according to the invention is capable of detecting all breakdowns or changes of outside environmental conditions which can lead to an unusual behaviour of the aircraft of the lateral dissymmetry type.

In a preferred embodiment, said flight parameters represent the roll rate and the yaw rate of the aircraft, and said auxiliary parameters represent the deflection angles of control surfaces of the roll axis and yaw axis respectively.

In addition, in one particular embodiment, advantageously, in step b):

in addition, at least one auxiliary monitoring is carried out, for detecting at least a breakdown likely to generate a lateral dissymmetry of the aircraft, for example an engine breakdown, an aileron breakdown, or a breakdown generating an incorrect distribution of the fuel among both wings; and a dissymmetry information is generated and an enabling signal is transmitted when such a breakdown is detected.

This particular embodiment therefore enables to combine the overall detection in accordance with the invention to one or more usual detections intended to detect specific breakdowns likely to originate a lateral dissymmetry of the aircraft. With such combination, a particularly consistent method is obtained. Moreover, such combination enables to associate the overall detection in accordance with the invention to usual particular means.

In addition, preferably, in case of transmitting an enabling signal, said enabling function is implemented only if the current value of roll of the aircraft is less than a predetermined value, for example 0.3 degree. This enables to discriminate a normal lateral behaviour of the aircraft (for example, a turn which is manually controlled by the pilot or automatically controlled by auto-flight means) from an unusual lateral behaviour (dissymmetry of the aircraft). Thus, the confirmation function is enabled only if the roll angle is less than said predetermined value, that is only if facing an unusual lateral behaviour.

Besides, advantageously, in step c), the level of a detected lateral dissymmetry is also determined, as a function of equilibrium current values of said second couple. This level of the lateral dissymmetry can, for example, be used for helping:

searching the origin of the lateral dissymmetry;
implementing an optimisation of the aircraft performance; and/or
implementing maintenance.

In a preferred embodiment, in step d), when a detection signal is transmitted, an alarm signal is generated, intended, in particular, to notify the pilot of the dissymmetry such that the pilot adapts the control to this unusual situation.

In this step d), at least one of the following operations can also be implemented, when a detection signal is transmitted:

showing the dissymmetry information on a display screen of the cockpit of the aircraft;
recording this dissymmetry information which can, for example, be used at the end of flight for assisting maintenance actions; and
using said dissymmetry information for automatically or manually controlling elements of the aircraft likely to minimise the detected lateral dissymmetry.

Besides, advantageously, said first and second sets and said auxiliary set are determined, in a preliminary step before the flight, through simulations. It shall be noticed that said auxiliary set should be able to characterise an equilibrium situation, for which the configuration of the aircraft enables to compensate for the effects of lateral dissymmetry.

This invention also relates to an on-board device for automatically detecting, during a flight, on board an aircraft, a lateral dissymmetry of said aircraft.

According to the invention, said device is remarkable in that it includes:

first means for automatically determining the current values of a first couple of flight parameters of the aircraft, which are likely to be affected by a lateral dissymmetry of the aircraft, and the current values of a second couple of auxiliary parameters illustrating the deflections of control surfaces of the aircraft, which act on the lateral behaviour of the latter;

second means for automatically carrying out a dynamic monitoring function of:
on the one hand, checking whether said current values of said first couple are in a first predetermined set of couples of flight parameters;
on the other hand, checking whether said current values of said second couple are in a second predetermined set of couples of auxiliary parameters; and
generating a dissymmetry information indicating on which side of the aircraft is the origin of a dissymmetry and transmitting an enabling signal, when, at least during a predetermined period, said first and second couples of current values are simultaneously in said first and second sets respectively;

third means for automatically carrying out a function of static confirmation at the end of a predetermined auxiliary time period after transmitting, if necessary, an enabling signal, said static confirmation function being of checking if the equilibrium current values of said second couple are in at least one predetermined auxiliary set of auxiliary parameters and transmitting a detection signal which indicates the detection of the lateral dissymmetry and the side of lateral dissymmetry, if said current values are in said auxiliary set; and fourth means for using said dissymmetry information on board the aircraft, when a detection signal is transmitted by said third means.

The device in accordance with this invention therefore includes means for observing the overall conditions of the aircraft, and for determining, after an analysis, whether the aircraft behaviour is the one expected or whether it shows a defect (of the lateral dissymmetry type).

This invention also relates to an aircraft, in particular a cargo aircraft, which includes a device as mentioned above.

BRIEF DESCRIPTION OF THE DRAWINGS

The figures of the appended drawing will help better understand how the invention can be carried out. In these figures, identical references denote similar elements.

DETAILED DESCRIPTION

Figure 1:
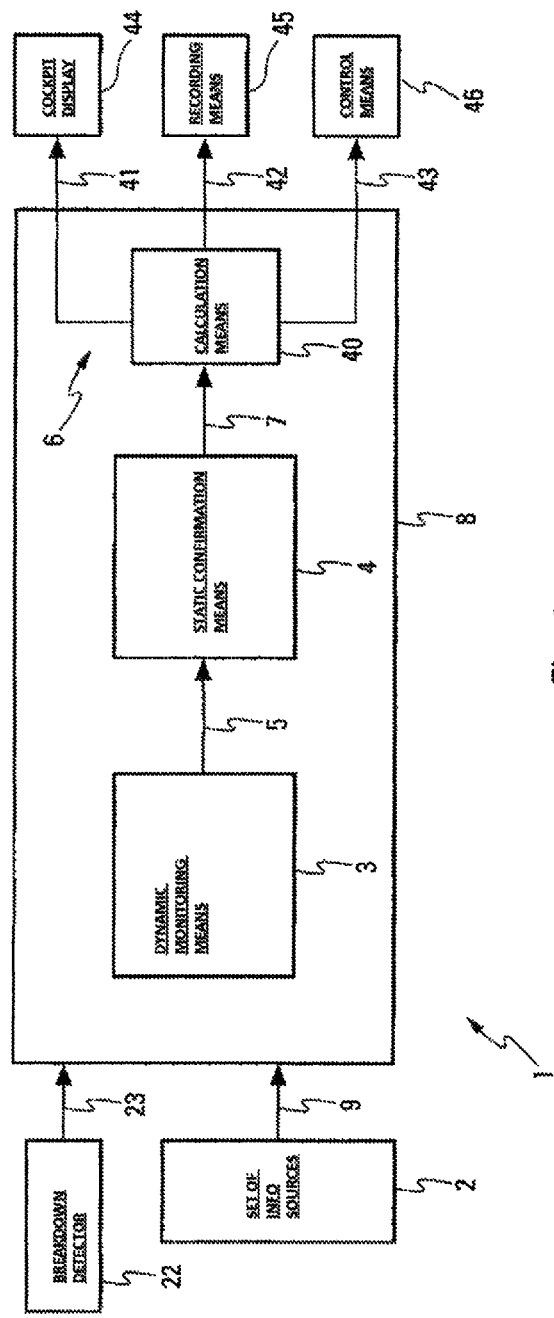
FIG. 1 is a block diagram of an automatic detection device in accordance with the invention.

The device 1 in accordance with the invention and schematically depicted in FIG. 1 is intended to automatically detect, on board an aircraft A, particularly a cargo aircraft, during a flight, a lateral dissymmetry of such aircraft A. A lateral dissymmetry represents a symmetry defect between the right side and the left side of said aircraft A with respect to the median vertical plan thereof (which is, in the ease of an aircraft, the plane perpendicular to the average plane of the wings, intersecting the longitudinal axis thereof), which is due to a breakdown or to particular outside environmental conditions.

Figure 2:
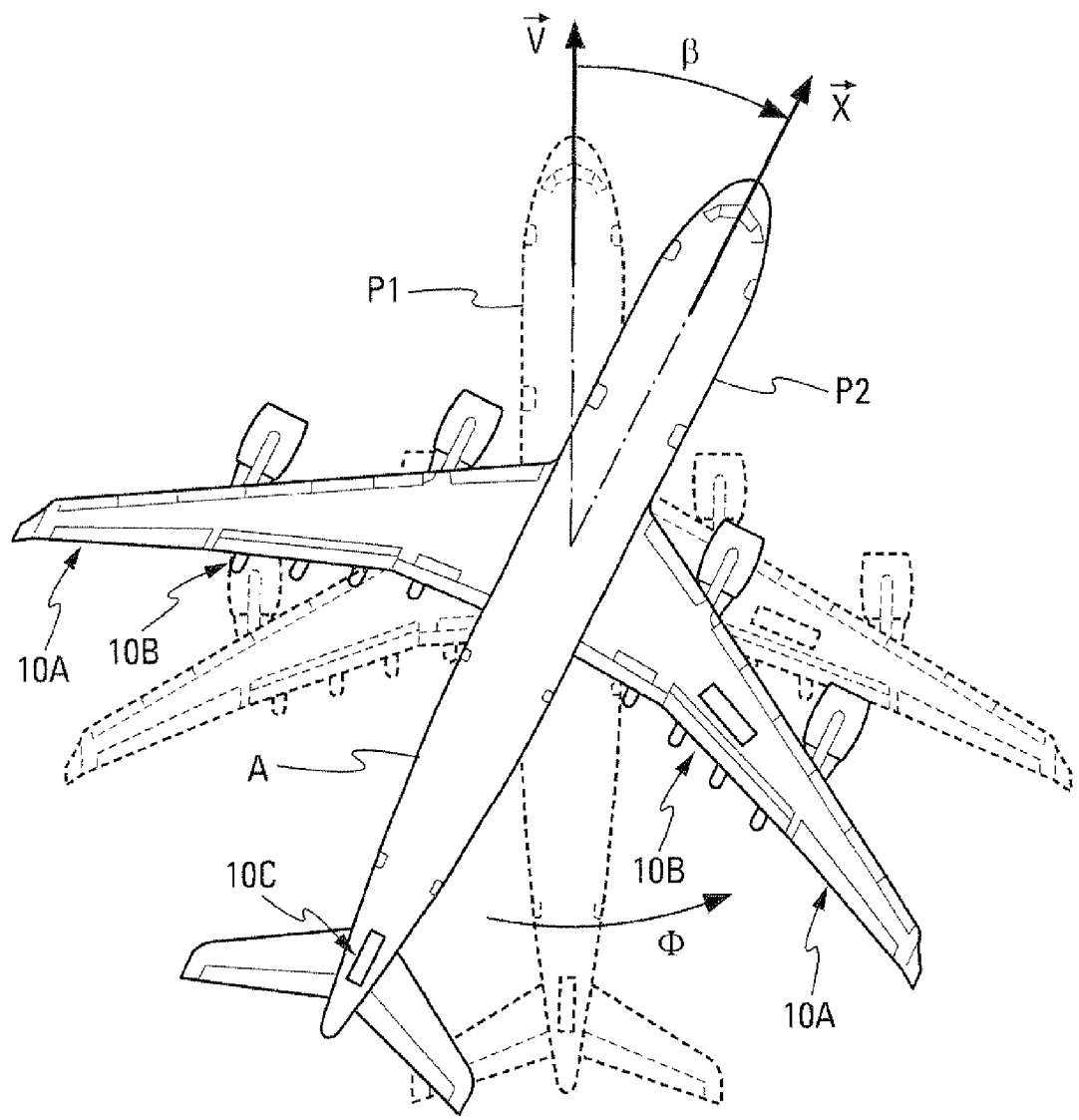
FIG. 2 schematically illustrates, in a plan view, the effects generated by a lateral dissymmetry on the lateral behaviour of an aircraft.

FIG. 2 illustrates the effects generated on the lateral behaviour of an aircraft A by a lateral dissymmetry. This FIG. 2 shows the speed vector $\vec{V}$ and the longitudinal axis $\vec{X}$ of the aircraft A and has:
- a normal position P1, without sideslip, as appears in normal operating conditions, which is depicted in broken lines; and
- a position P2 in full line illustrating the position of the aircraft A upon a lateral dissymmetry, corresponding to the dynamics of the aircraft A, the latter returning to position P1 when static.

A lateral dissymmetry generally results in the following effects on the behaviour of the aircraft A:
- a rolling movement with an angle Φ, which can be compensated for, usually, by control surfaces of the roll axis (ailerons 10A, and spoilers 10B particularly); and
- a yaw movement with an angle β, which can be compensated for, usually, by control surfaces of the yaw axis (rudder 10C, particularly).

According to the invention, in order to automatically detect such a lateral dissymmetry, said device 1 which is on board the aircraft A, comprises:
- a set 2 of information sources, detailed below, which are in particular intended to automatically determine:
  - the current values of a first couple of flight parameters of the aircraft A. Within the scope of the present invention, the flight parameters of this first couple are likely to be affected by a lateral dissymmetry of aircraft A. Preferably, said flight parameters represent the roll rate (with a current value P given, for example, in degrees per second) and the yaw rate (with the current value R, given, for example, in degrees per second) of the aircraft A; and
  - the current values of a second couple of auxiliary parameters which illustrate the deflections of control surfaces of the aircraft A. Within the scope of the present invention, the auxiliary parameters of this second couple act on the lateral behaviour of the aircraft A. Preferably, said auxiliary parameters represent the deflection angle (with a current value DP given, for example, in degrees) of control surfaces of the roll axis (ailerons 10A, spoilers 10B) and the deflection angle (with a current value DR, given, for example, in degrees) of control surfaces of the yaw axis (rudder 10C);
- means 3 for automatically performing a dynamic monitoring function. This dynamic monitoring function provides, first, checking whether both:
  - said current values P and R of said first couple are simultaneously in a first predetermined set E1 (of couples of flight parameters); and
  - said current values DP and DR of said second couple are simultaneously in a second predetermined set E2 (of couples of auxiliary parameters).

This dynamic monitoring function provides in addition, when at least during a predetermined time period T1 (for example 3 seconds), said first and second couples of current values are simultaneously in said first and second sets E1 and E2 respectively, transmitting an enabling signal and generating a dissymmetry information (which indicates on which side of the aircraft A is the origin of the dissymmetry);
- means 4 which are connected through a link 5 to said means 3 and which are provided such that a static confirmation function is automatically performed, at the end of a predetermined time period T2 (for example 10 seconds) after the transmission of the enabling signal by the means 3. Said static confirmation function provides comparing the equilibrium current values DP and DR of said second couple with a predetermined auxiliary set E3 (of auxiliary parameters) and transmitting a detection signal (which indicates a confirmed detection of lateral dissymmetry), if said equilibrium current values DP and DR are simultaneously in said auxiliary set E3; and
- means 6 which are connected through a link 7 to said means 4 and which use, on board the aircraft A, upon detection of the lateral dissymmetry, the dissymmetry information generated by said means 3.

With the device 1 accordance with the invention, a lateral dissymmetry of said aircraft A can therefore be detected automatically, in real-time, on board an aircraft A. For that purpose, said device 1 provides, on the one hand, monitoring a combination of current values P, R, DP and DR of parameters (flight parameters and auxiliary parameters) of the aircraft A and identifying the dynamic patterns corresponding to an unusual behaviour, and on the other hand, characterising and confirming a lateral dissymmetry based on equilibrium deflections of control surfaces.

This detection device 1 is therefore based on observing the conditions of the aircraft A and control surfaces which act on the lateral behaviour thereof. It relies on the overall behaviour of the aircraft A and refers to reactions of said aircraft A when it is subjected to a lateral dissymmetry. Through these characteristics, the device 1 in accordance with this invention is capable of detecting any breakdown or change of outside environmental conditions likely to lead, during a flight, to an unusual behaviour of the aircraft A of the lateral dissymmetry type.

In a particular embodiment, said means 3 and 4 are integrated into a processing unit 8 which is, in particular, connected through links (shown as a general link 9) to said set 2 of information sources.

Said set 2 of information sources particularly includes:
- an ADIRU-type air reference unit, which measures, usually, the roll angle Φ, the roll rate P and the yaw rate R;
- usual means for measuring the positions DP and DR of the control surfaces; and
- usual means for determining, in particular, mass, centring and speed of the aircraft A.

Figure 3:
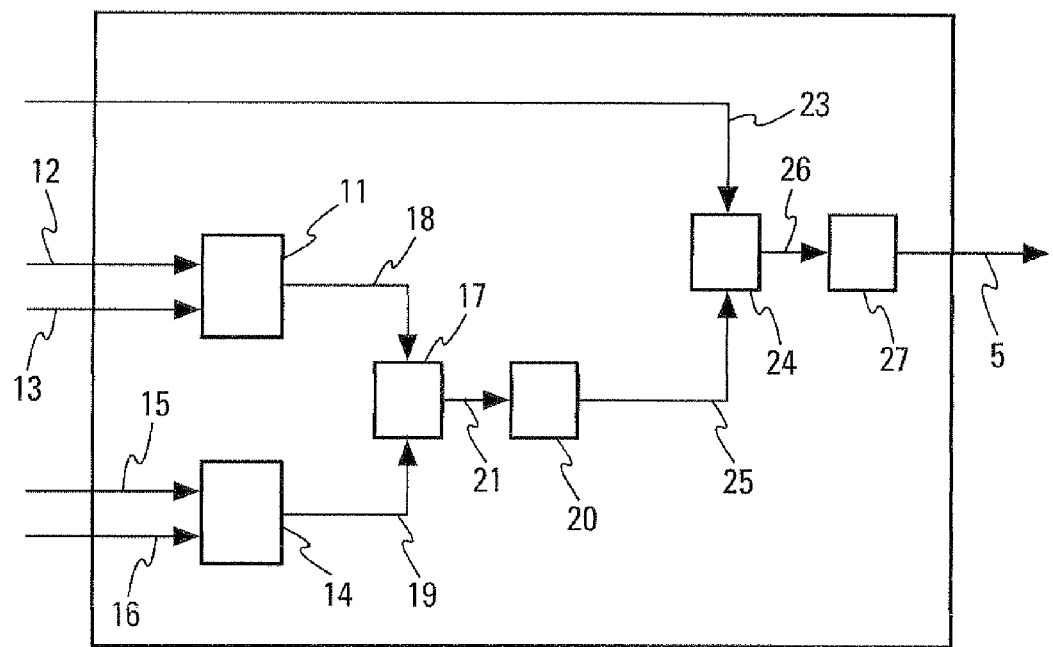
FIGS. 3 and 4 are block diagrams of means which are part of a detection device in accordance with the invention.

Said means 3 which are intended to implement the dynamic monitoring function include, as depicted in FIG. 3:
- means 11 which receive from the set 2, through links 12 and 13 respectively, the current value P of the roll rate and the current value R of the yaw rate of the aircraft A and which check whether these current values P and R are in said set E1;
- means 14 which receive from the set 2, through links 15 and 16 respectively, the current value DP and DR of the deflection angles of the control surfaces, of the roll axis and the yaw axis respectively and which check whether these current values DP and DR are in said set E2;
- an AND logic gate 17 which is connected through links 18 and 19 to said means 11 and 14 respectively, and which is intended to check that the corresponding parameters are simultaneously in said sets E1 and E2; and means 20 which are connected through a link 21 to said AND logic gate 17 and which check whether the values representing a dissymmetry are maintained for a time period T1, for example three seconds. The aim of these means 20 is to avoid sending an enabling signal, when the detected phenomena are in particular due to a turbulence or (quickly varying) oscillating breakdowns.

Figure 5:
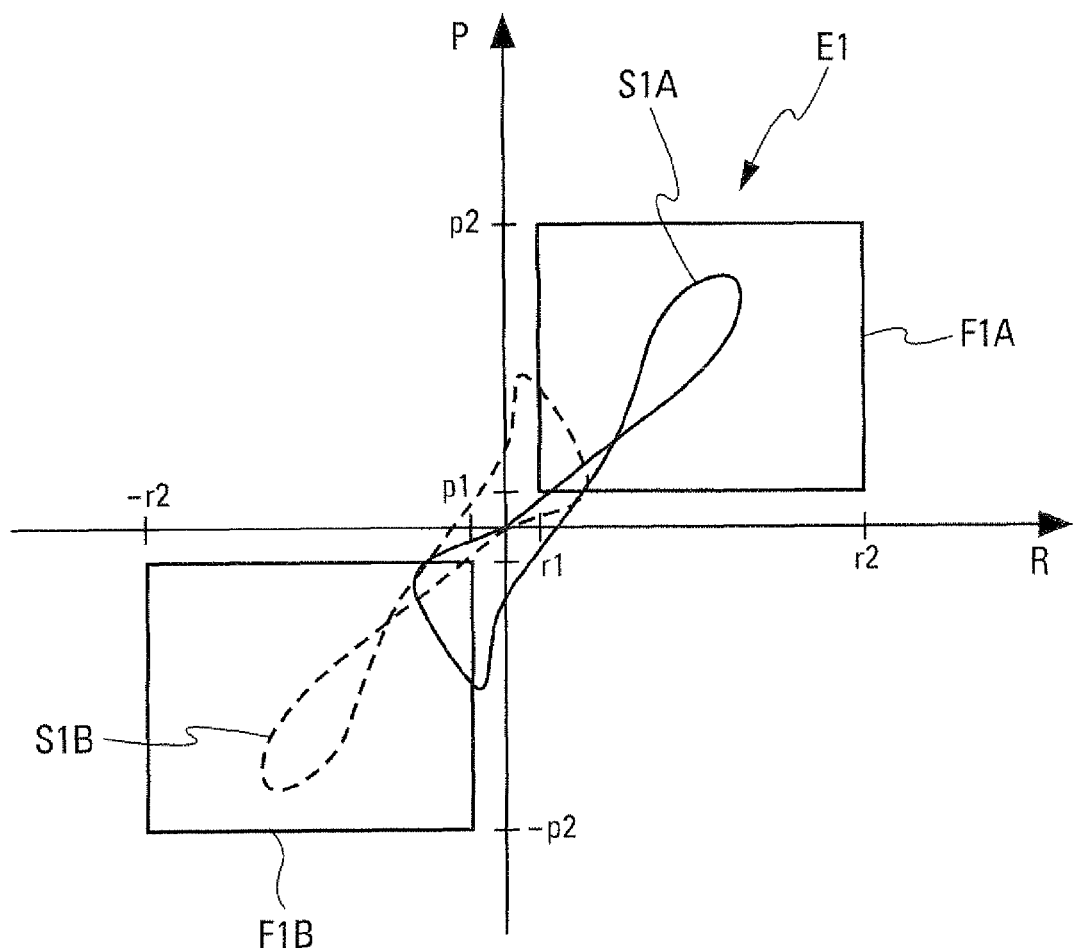
FIGS. 5 to 7 are graphs for explaining the calculation methods used in the dynamic monitoring and static confirming functions, in accordance with this invention.

Referring to FIG. 5, said set E1 includes two windows F1A and F1B as rectangles. The window F1A which is defined by predetermined values r1, r2, p1 and p2 represents a right side dissymmetry of the aircraft A, and the window F1B (which is defined by predetermined values −r1, −r2, −p1 and −p2) represents a left side dissymmetry of the aircraft A. In FIG. 5 is also shown a possible example of dynamic signatures of said flight parameters, with a plot S1A in full line in the case of a right side dissymmetry, and with a plot S1B in broken lines in the case of a left side dissymmetry.

Figure 6:
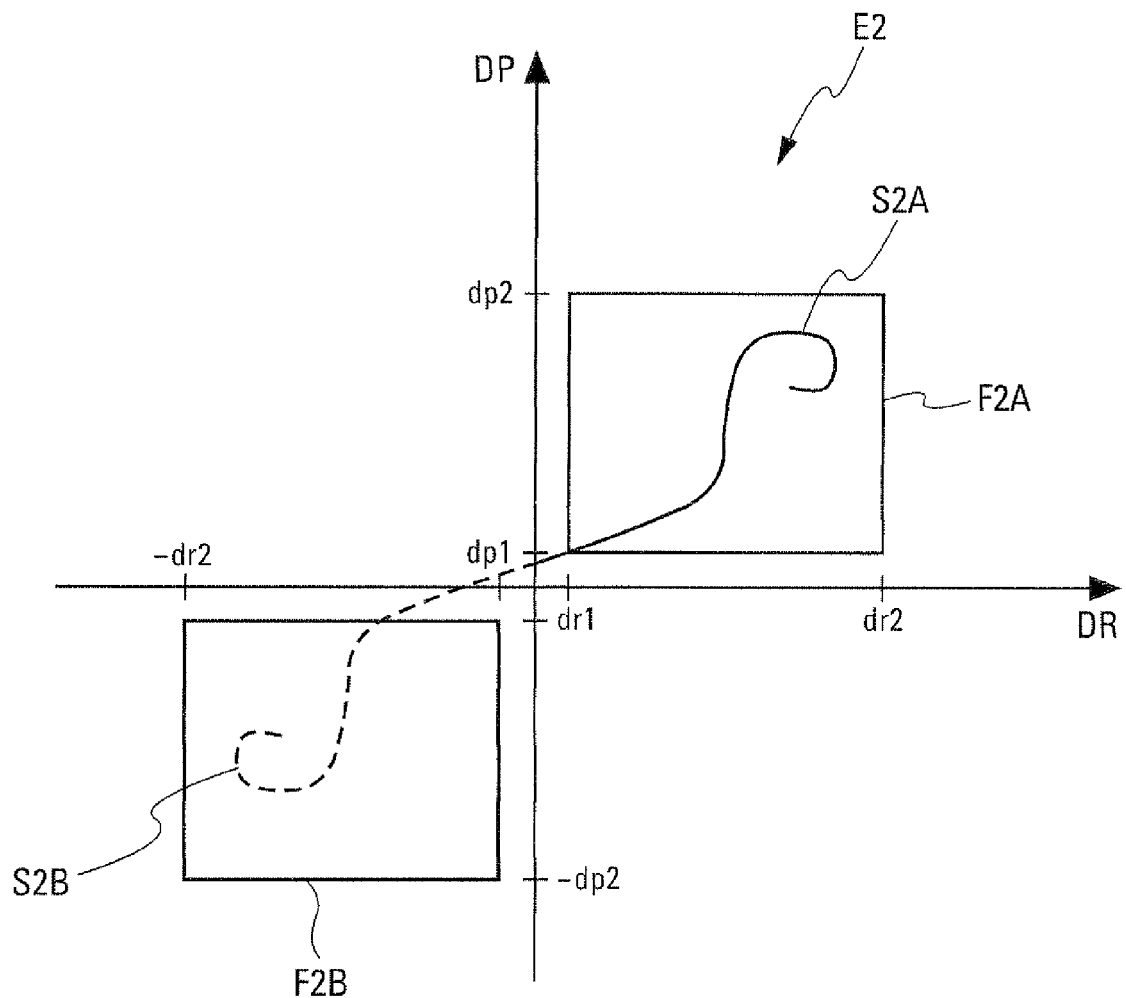

In addition, in FIG. 6, said set E2 includes two windows F2A and F2B as rectangles. The window F2A which is defined by predetermined values dr1, dr2, dp1 and dp2 represents a right side dissymmetry of the aircraft A, and the window F2B (which is defined by predetermined values −dr1, −dr2, −dp1 and −dp2) represents a left side dissymmetry of the aircraft A. In FIG. 6 is also depicted a possible example of dynamic signatures of said auxiliary parameters, with a plot S2A in full line in the case of a right side dissymmetry, and with a plot S2B in broken lines in the case of a left side dissymmetry.

In the examples of FIGS. 5 and 6, the signatures S1A, S1B, S2A and S2B depicted in an illustrative way are not completely within the corresponding windows. However, as detailed below, for implementing this invention, the investigated parameters should be effectively within a window only for the time period T1.

In a preferred embodiment, depicted in FIGS. 1 and 3, the device 1 in accordance with the invention includes, in addition, means 22 which are, for example, connected through a link 23 to said processing unit 8 and which are provided such that one or more auxiliary monitorings are carried out. Each of these auxiliary monitorings enables specific breakdowns likely to generate a lateral dissymmetry of the aircraft A to be detected. Illustratively, said means 22 can include usual means for detecting a breakdown of a control surface, for example an aileron, or a fuelling breakdown resulting in a fuelling problem on one side of aircraft A.

In this preferred embodiment, said means 3 include, in addition, as depicted in FIG. 3, an OR logic gate 24 which is connected through link 23 and 25 to said means 22 and 20 respectively and which is associated through a link 26 with a means 27 which transmits an enabling signal when a lateral dissymmetry is suspected either by said usual means 22, or by means 11, 14, 17 and 20 in accordance with the invention.

Figure 4:
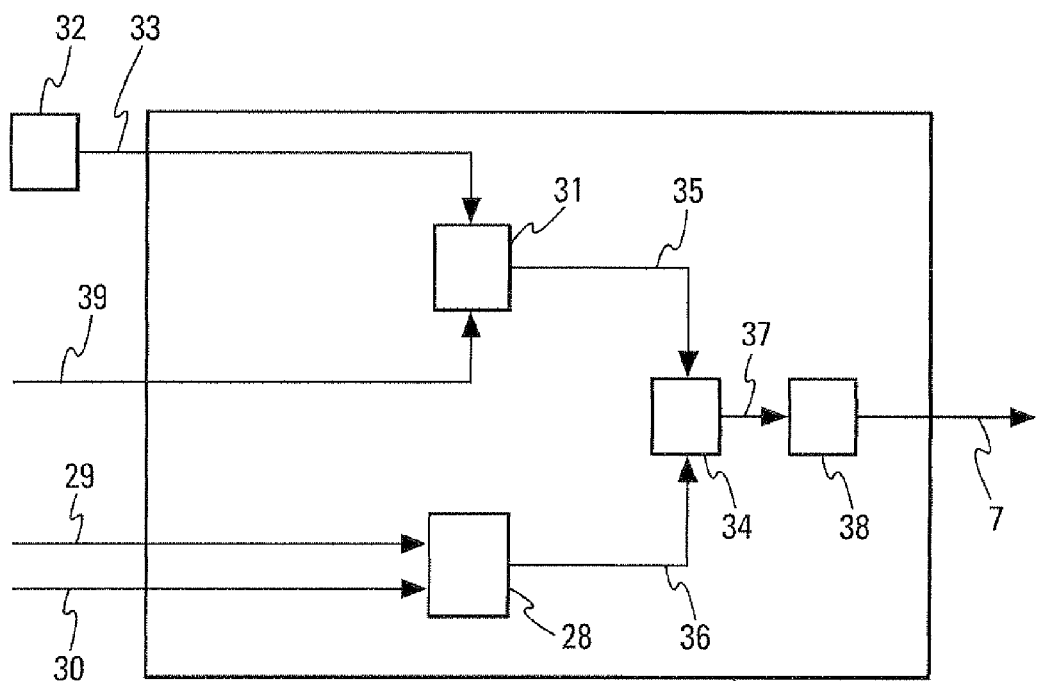

When such an enabling signal is transmitted, the means 4 automatically implement a static control function. For that purpose, said means 4 include, as depicted in FIG. 4:
  means 28 which receive from the set 2, through links 29 and 30 respectively, the equilibrium current values DP and DR of the deflection angles of the control surfaces, of the roll axis and the yaw axis respectively, and which check whether these current values are in said set E3;
  a comparison means 31 which compares the current value of the roll, received from said set 2 through a link 39, with a predetermined threshold value, for example 0.3 degree, which is recorded in an usual means 32 (which is connected through a link 33 to said comparison means 31);
  an AND logic gate 34 which is connected through links 35 and 36 respectively to said means 31 and 28 and which is associated through a link 37 with a means 38 which is intended to transmit a detection signal via the link 7.

Figure 7:
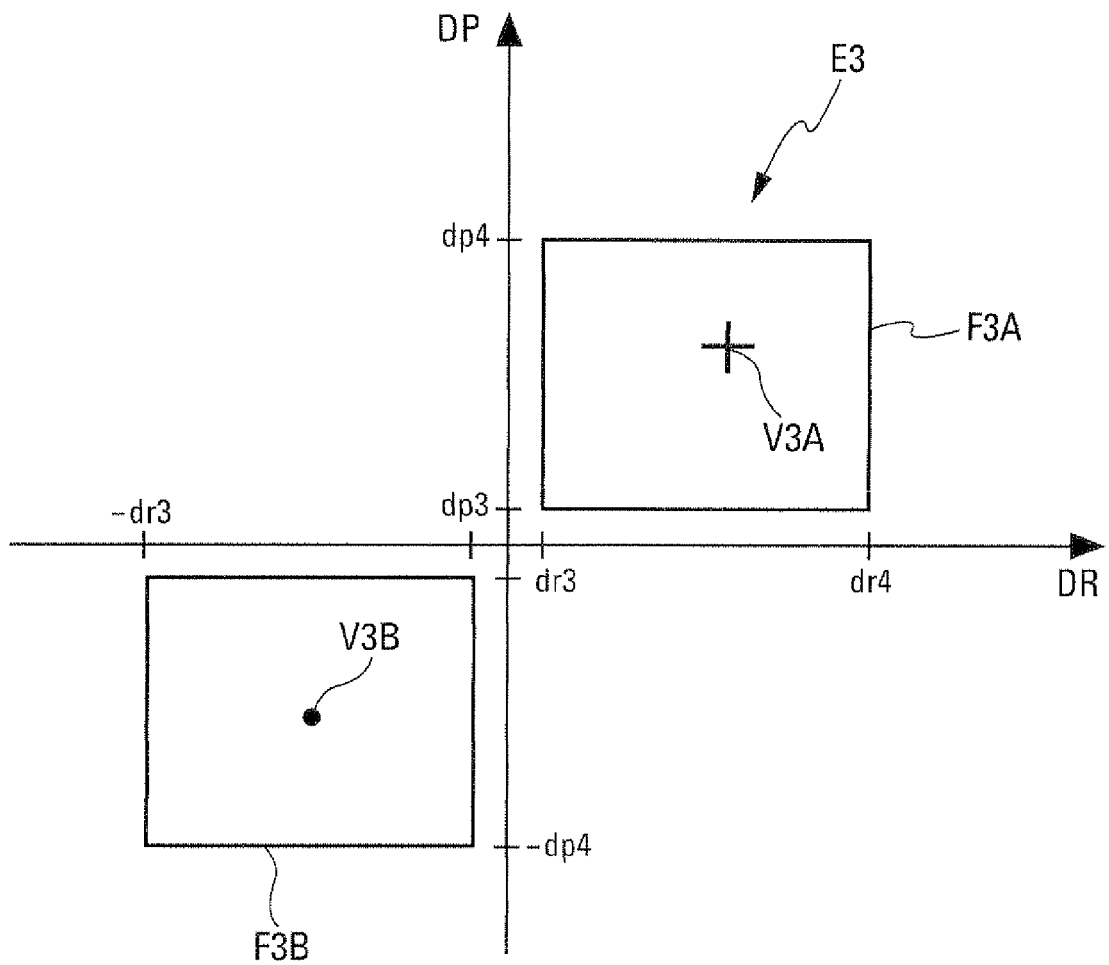

In FIG. 7, said set E3 includes two windows F3A and F3B as rectangles. The window F3A which is defined by predetermined values dr3, dr4, dp3 and dp4 represents a right side dissymmetry of aircraft A, and the window F3B (which is defined by predetermined values −dr3, −dr4, dp3 and −dp4) represents a left side dissymmetry of aircraft A. In FIG. 7 is also depicted an example of possible values V3A and V3B at equilibrium, by a cross in the ease of a right side dissymmetry and by a point in the case of a left side dissymmetry respectively.

Said sets E1, E2 and E3 and said windows F1A, F1B, F2A, F2B, F3A and F3B (that is values r1, r2, p1, p2, dr1, dr2, dr3, dr4, dp1, dp2, dp3 and dp4 of these windows) are determined, at ground, before the flight, using usual simulations, and therefore depend in particular on the characteristics of the aircraft A.

It shall be noticed that, within the scope of the present invention:
  the monitoring function, implemented by means 3, is so-called dynamic, because it takes into account, during a time period T1, for example 3 seconds, the current values P, R, DP and DR of flight parameters and auxiliary parameters which vary as a function of time and are therefore dynamic;
  the confirmation function, implemented by means 4, is so-called static, because it takes into account the current values DP and DR of auxiliary parameters which correspond to equilibrium values and which are therefore stable; and
  the equilibrium is achieved, after the time period T2, when the aircraft A is brought into a configuration enabling the lateral dissymmetry to be compensated for. Such a lateral dissymmetry is generally compensated for, during a flight, either automatically by an auto-flight device of the aircraft A, or manually by the pilot using control members of control surfaces. These actions aim at ensuring some stability to the aircraft A and some comfort for the passengers.

Besides, since the different windows are taken into account, said means 3 are also capable of defining, in case of a suspected dissymmetry, the side of the aircraft A which is the origin of the dissymmetry. In this case, said means 3 can generate dissymmetry information which indicates on which side of the aircraft A is the origin of the dissymmetry.

The static observation of deflections of the control surfaces of the lateral axis, used by said means 4, also helps quantifying (using the equilibrium values DP and DR) the level of the lateral dissymmetry. With this information, the pilot is provided with information likely to help looking for the origin of dissymmetry, likely to be used for automatically optimising the performance of aircraft A, or for carrying out maintenance actions on the ground after the flight.

Besides, said means 6 include a calculation means 40 which is connected to said means 4 through the link 7 and which is capable of transmitting information relating to a detected lateral dissymmetry, in particular the side of dissymmetry and the level of the latter, through the links 41, 42 and 43, respectively to means 44, 45 and 46 intended to use this dissymmetry information on board the aircraft A, when a detection signal is transmitted by said means 4. In an illustrative way:
  the means 44 can show the dissymmetry information in the cockpit of the aircraft A, for example on a display screen;

the means 45 can record this dissymmetry information which can, for example, be used at the end of the flight for assisting maintenance actions; and the means 46 can use said dissymmetry information for automatically or manually controlling the usual elements of the aircraft A likely to minimise the detected lateral dissymmetry.

In a preferred embodiment, said means 44 are also capable of transmitting a sound and/or visual alarm, upon detection of a lateral dissymmetry, in particular in order to notify the pilot of the dissymmetry such that the pilot adapts the control to such unusual situation.

The invention claimed is:

1. A method for automatically detecting, on board an aircraft (A), during a flight, a lateral dissymmetry of said aircraft (A), comprising automatically:
   a) determining, by a processor, the current values (P, R) of a first couple of flight parameters of the aircraft, which represent the roll rate and the yaw rate of the aircraft (A) and the current values (DP, DR) of a second couple of auxiliary parameters illustrating the deflections of control surfaces (10A, 10B, 10C) of the aircraft (A), which act on the lateral behaviour of the latter;
   b) carrying out, by a processor, a dynamic monitoring function comprising:
      on the one hand, checking whether said current values (P, R) of said first couple are in at least a first predetermined set (E1) of couples of flight parameters;
      on the other hand, checking whether said current values (DP, DR) of said second couple are in at least a second predetermined set (E2) of couples of auxiliary parameters; and
      generating a dissymmetry information indicating on which side of the aircraft (A) is the origin of a dissymmetry and transmitting an enabling signal, when, at least during a predetermined period, said first and second couples of current values are simultaneously in said first and second sets (E1, E2) respectively,
      said successive steps a) and b) being implemented repeatedly;
   c) when an enabling signal is transmitted, at the end of a predetermined auxiliary period after such transmission, carrying out a static confirmation function for checking whether the equilibrium current values (DP, DR) of said second couple are in at least a predetermined auxiliary set (E3) of auxiliary parameters and transmitting a detection signal which indicates the detection of a lateral dissymmetry and the side of lateral dissymmetry, if said current values (DP, DR) are in said auxiliary set (E3); and
   d) when a detection signal is transmitted, using said dissymmetry information on board the aircraft (A).

2. The method according to claim 1, wherein said auxiliary parameters represent the deflection angles of control surfaces of the roll axis and the yaw axis respectively.

3. The method according to claim 1 wherein in step b), in addition, at least one auxiliary monitoring is carried out, for detecting at least a breakdown likely to generate a lateral dissymmetry of the aircraft (A), and a dissymmetry information is generated and an enabling signal is transmitted when such a breakdown is detected.

4. The method according to claim 1, wherein, in case an enabling signal is transmitted, said enabling function is implemented only if the current value of the roll of the aircraft is less than a predetermined value.

5. The method according to claim 1, wherein, in step c), in addition, the level of lateral dissymmetry is determined as a function of said equilibrium current values of said second couple.

6. The method according to claim 1, wherein in step d), when a detection signal is transmitted, an alarm signal is transmitted.

7. The method according to claim 1, wherein in step d), when a detection signal is transmitted, at least one of the following operations is implemented:
   said dissymmetry information is shown on a display screen of the cockpit of the aircraft (A);
   said dissymmetry information is recorded; and
   said dissymmetry information is used to control elements of the aircraft (A) likely to minimise the detected lateral dissymmetry.

8. The method according to claim 1, wherein said first and second sets and said auxiliary set are determined, in a preliminary step before the flight, using simulations.

9. A device for automatically detecting, on board an aircraft (A), during a flight, a lateral dissymmetry of said aircraft (A), comprising:
   first means (2) for automatically determining the current values (P, R) of a first couple of flight parameters of the aircraft (A), which represent the roll rate and the yaw rate of the aircraft (A), and the current values (DP, DR) of a second couple of auxiliary parameters illustrating the deflections of control surfaces of the aircraft, which act on the lateral behaviour of the latter;
   second means (3) for automatically carrying out a dynamic monitoring function comprising
      on the one hand, checking whether said current values (P, R) of said first couple are in at least a first predetermined set (E1) of couples of flight parameters;
      on the other hand, checking whether said current values (DP, DR) of said second couple are in at least a second predetermined set (E2) of couples of auxiliary parameters; and
      generating a dissymmetry information indicating on which side of aircraft (A) is the origin of a dissymmetry and transmitting an enabling signal, when, at least during a predetermined period, said first and second couples of current values are simultaneously in said first and second sets (E1, E2) respectively;
   third means (4) for automatically carrying out a function of static confirmation at the end of a predetermined auxiliary time period after transmitting, if necessary, an enabling signal, said static confirmation function being of checking if the equilibrium current values (DP, DR) of said second couple are in at least one predetermined auxiliary set (E3) of auxiliary parameters and transmitting a detection signal which indicates the detection of lateral dissymmetry and the side of lateral dissymmetry, if said current values (DP, DR) are in said auxiliary set (E3); and
   fourth means (6) for using said dissymmetry information on board the aircraft (A), when a detection signal is transmitted by said third means (4).

10. An aircraft, wherein it includes a device (1) as specified in claim 9.

* * * * *